United States Patent Office 3,524,814
Patented Aug. 18, 1970

3,524,814
METHOD OF PREPARING OVER-BASED
ALKALINE EARTH SULFONATES
Albert R. Sabol, Munster, and Eli W. Blaha and Cecil G. Brannen, Highland, Ind., assignors to Standard Oil Company, Chicago, Ill., a corporation of Indiana
No Drawing. Filed June 20, 1966, Ser. No. 558,571
Int. Cl. C10m 1/40, 1/32, 1/10
U.S. Cl. 252—33.2
9 Claims

ABSTRACT OF THE DISCLOSURE

The preparation of over-based alkaline earth sulfonates by carbonating with carbon dioxide an oil mixture of neutral alkaline earth sulfonate, alkaline earth oxide, and alkanol is improved by initially forming and maintaining a catalytic amount of ammonium carbamate in the mixture during the treatment thereof with carbon dioxide.

---

This invention relates to an improved method of preparing over-based alkaline earth sulfonates which are useful as lubricating oil additives.

Heavy-duty detergent-type lubricating oil compositions for use in spark-ignition internal combustion engines and in diesel engines should possess at least two characteristics in addition to lubricity, oxidation and thermal stability, rust and/or corrosion inhibiting properties, etc. First, the oil should possess the power to disperse insolubles formed by fuel combustion and/or oil oxidation. Second, the oil should be capable of neutralizing acidic materials formed by the oxidation of the oil. These last two characteristics can be imparted to the lubricating oil by incorporating therein over-based or highly alkaline detergents.

Increasing the alkalinity of such detergency addition agents is commonly known as "over-basing." The highly desirable effect from over-basing is to obtain the carbonate, or sometimes other salt, of the alkaline earth metal in finely dispersed form within the composition. Although such over-basing is usually carried out using either barium or calcium, over-basing with calcium is especially difficult and it becomes particularly desirable to provide over-basing methods which are capable of utilizing calcium in the desired manner. Calcium neutralized and over-based detergents would probably be equally effective as replacements for barium neutralized and over-based products; and in view of the lower cost for calcium compounds, economic advantages could be obtained. However, it has been difficult, if not impossible, to obtain calcium-containing detergents having sufficient calcium present, e.g. in the form of calcium carbonate, to provide adequate high-temperature detergency for modern engines. Much difficulty has been encountered in working especially with inorganic basic calcium compounds in attempting to utilize calcium from such compounds to an acceptable extent. Attempts to utilize calcium compounds often give discouraging results apparently due to some inability of the calcium compounds to react sufficiently during neutralization and over-basing procedures. For example, it has been extremely difficult to obtain a neutralized over-based product containing even one mole of calcium per mole of acidic component of calcium salt detergents.

One method of over-basing is described and claimed in U.S. Pat. No. 3,126,340, issued Mar. 24, 1964, to A. Sabol, E. W. Blaha, and G. S. Curosh. In accordance with teachings of this patent, over-basing is carried out by treating a neutral salt, e.g. a neutral calcium sulfonate, with an alkaline earth metal oxide, such as calcium oxide, while blowing in the gaseous carbon dioxide and ammonia, using a total of 2 moles of carbon dioxide and 2 moles of ammonia. In the process of the patent, ammonium carbamate, formed by the carbon dioxide and ammonia, is dispersed through the neutral salt mixture, then converted to the alkaline earth carbamate which is then thermally decomposed in the presence of water or steam to produce finely divided suspended alkaline earth carbonate with the detergent addition agent. The alkaline earth carbonate provides the alkaline reserve of the over-based detergent.

In the method of over-basing disclosed in U.S. 3,126,-340, supra, sufficient ammonia is added to convert all of this alkaline earth oxide to the alkaline earth carbamate. The present invention is an improvement in this method of over-basing.

It is an object of this invention to provide an improved method of preparing over-based alkaline earth sulfonates. It is a more particular object of this invention to provide a method for preparing over-based preferentially oil-soluble alkaline earth sulfonates suitable for use as lubricant additives.

In accordance with the present invention we have found that alkaline earth sulfonates can be easily over-based by introducing into a mixture comprising a neutral alkaline earth sulfonate, an excess of an alkaline earth oxide, and a lower alkanol, sufficient amounts of gaseous carbon dioxide to convert the oxides to carbonates, and catalytic amounts of ammonia, sufficient to form from about 0.01 to about 0.2 mole of carbamate in the mixture. We have discovered that this catalytic amount of carbamate is sufficient to activate the alkaline earth oxide to react with the carbon dioxide in the presence of the lower alkanol to form the desired finely dispersed alkaline earth carbonate in the sulfonate additive. The treatment of the mixture of alkaline earth sulfonate, alkaline earth oxide, and lower alkanol with ammonia and carbon dioxide is at a temperature of about 50° F. to 130° F. at a rate of from about 0.5 to about 3.0 cubic feet per hour in sufficient amounts to form from about 0.01 to about 0.2 mole of ammonium carbamate.

The alkaline earth oxides are well known to those skilled in the art and include the oxides of calcium, strontium, and barium, which are apparently converted to the hydroxide by hydrolysis during the present process. The oxide can be added to the reaction in combination with the water, i.e. as the hydroxide.

In the preferred application where a detergent of high alkaline reserve is produced, the present process is particularly advantageous in obtaining a product having a high calcium content; and in view of the general difficulties in utilizing calcium, the present process is especially effective where the alkaline earth is calcium.

Suitable alkaline earth sulfonates are the alkaline earth salts of preferentially oil-soluble sulfonic acids ($RSO_3H$), such as the preferentially oil-soluble petroleum sulfonic acids, commonly referred to as "mahogany acids," of about 350 to about 750 molecular weight, alkyl sulfonic acids, aryl sulfonic acids, and alkaryl sulfonic acids. Illustrative of such sulfonic acids are dilauryl benzene sulfonic acid, lauryl cetyl benzene sulfonic acid, paraffin-substituted benzene sulfonic acids, polyolefin alkylated benzene sulfonic acids, such as polybutylene alkylated benzene sulfonic acids in which the polybutylene substituents have molecular weights of at least about 200, and preferably within the range of from about 300 to about 2500, and polypropylene alkylated benzene sulfonic acids in which the polypropylene substituents have a molecular weight of at least about 250, and preferably within the range of from about 290 to about 1500. Examples of other suitable sulfonic acids are monoparaffin wax-substituted naphthalene sulfonic acids, diparaffin wax-substituted phenol sulfonic acids, wax sulfonic acids, petroleum naphthalene sulfonic acids, diphenyl ether sulfonic acids, diphenyl ether disulfonic acids, naphthalene disulfide sulfonic acids, naphthalene disulfide disulfonic acids, diphenyl amine disulfonic acids, diphenyl amine sulfonic acids, thiophene sulfonic acids, alphachloronaphthalene sulfonic acids, cetyl chlorobenzene sulfonic acids, cetyl sulfonic acids, cetyl-phenol disulfide sulfonic acids, cetyl-phenol monosulfide sulfonic acids, cetoxy capryl-benzene sulfonic acids, dicetyl thianthrene sulfonic acids, dilauryl beta-naphthol sulfonic acids, dicapryl nitro-naphthalene sulfonic acids; hydroxy-substituted paraffin wax sulfonic acids, tetra-isobutylene sulfonic acids, tetra-amylene sulfonic acids, chloro-substituted paraffin wax sulfonic acids, nitroso paraffin wax sulfonic acids, cetyl-cyclopentyl sulfonic acids, lauryl-cyclohexyl sulfonic acids, mono- and poly-wax-substituted cyclohexyl sulfonic acids. Other usable oil-soluble sulfonic acids are well described in the art, for example, see U.S. 2,616,904; U.S. 2,626,207; and U.S. 2,767,209.

In a particular embodiment of the present invention, the alkaline earth oxide and the sulfonate mixture is prepared concurrently with the neutralization of the sulfonic acid by the addition of an excess of the alkaline earth basic compound, e.g. the oxide, during the formation of the sulfonate, thereby providing the necessary alkaline earth basic compound in admixture with the sulfonate for subsequent treatment with the ammonia and carbon dioxide. The formation of the catalytic amount of alkaline earth carbamate activates the reaction of the alkaline earth basic compound, e.g. CaO, and the carbon dioxide to form the carbonate which provides the reserve alkalinity in the sulfonate addition agent. The neutralization reaction temperatures are well known in the art, e.g. about 100 to 400° F.

The process steps of the present invention comprise diluting the sulfonic acid with a solvent or diluent, such as a low viscosity lubricating oil and/or an aromatic or aliphatic hydrocarbon solvent, for example, mixed xylenes or hexane, adding to the diluted sulfonic acid an excess of the stoichiometric amount of the alkaline earth basic oxide and from about 5 moles to about 20 moles of a lower alkanol, e.g. methanol, ethanol, isopropyl alcohol and the like. Sufficient ammonia and carbon dioxide are then added to the mixture at the rate of from about 0.5 to about 3.0 cubic feet per hour to form from about 0.01 mole to about 0.2 mole ammonium carbamate. The introduction of ammonia into the mixture is then discontinued; and the carbon dioxide introduction is continued at the rate of from about 0.5 to about 3.0 cubic feet per hour until substantially all of the alkaline earth oxide is converted to the carbonate. During the introduction of the ammonia and carbon dioxide, i.e. during the formation of the carbamate, the temperature of the mixture is maintained below the decomposition temperature of the carbamate, i.e. below about 160–180° F.; the preferred temperature range for the reaction being from about 60° F. to about 110° F. The temperature of the reaction mixture during the continued carbon dioxide addition is between about 75° F. and about 120° F. After the addition of the carbon dioxide, the reaction mixture temperature is raised to remove the alkanol, and if desired, a part of the hydrocarbon diluent, e.g. xylene. After removal of the alkanol, the temperature of the mixture is maintained at about 190–210° F. and from about 0.05 to about 3 moles, preferably 0.5 to 2 moles, of water per mole of alkaline earth metal oxide charged is slowly added to the reaction product. The reaction product mixture is thereafter heated to a temperature of from about 220° F. to about 400° F. and filtered through a suitable filtration media, e.g. diatomaceous earth, to remove oil-insoluble materials. If the filtration temperature is not sufficiently high to remove the hydrocarbon diluent, the filtrate is heated to a temperature sufficiently high to remove the diluent.

Although the present invention is amenable to the preparation of over-based alkaline earth sulfonates, it is particularly suitable for the preparation of over-based calcium sulfonates.

The following specific examples illustrate the process of the present invention.

EXAMPLE I

Two hundred and fifty grams (0.5 mole equiv.) of a detergent alkylate bottoms (DAB) sulfonic acid (molecular weight 447) were diluted with 250 grams of a SAE 5 mineral oil and with sufficient xylene to give a mixture containing 22% of the sulfonic acid. To the diluted sulfonic acid mixture were added 170 grams CaO (3 moles) and 400 ml. methanol. Gaseous ammonia and carbon dioxide were then introduced into the mixture at the rate of 1.6 cubic feet per hour for five minutes (equivalent to 0.15 mole $NH_3$). The addition of $NH_3$ was then discontinued; and the introduction of $CO_2$ continued at the same rate for 85 minutes at a temperature between about 75° F. and 120° F. After the addition of the $CO_2$, the reaction product was heated to 210° F. to remove the methanol and a portion of the xylene, after which 3 moles of water were slowly added to the reaction product. The product was then heated to a temperature of 220–230° F. and filtered through diatomaceous earth, and the filtrate heated to 320° F to remove the xylene. The solvent-free filtrate contained 28.4% sulfonic acid, 15.2% calcium, and had a total base number (TBN) of 398; and a Ca utilization of 97%.

In preparations using six or more moles of calcium oxide per mole of sulfonic acid, it is recommended that water, in amounts of from about 0.05 mole to about 3 moles, preferably about 0.1 to about 0.5 mole, per mole of CaO, be added to the mixture of diluted sulfonic acid and calcium oxide prior to the addition of the carbon dioxide.

The beneficial effect obtained by using catalytic amounts of ammonia is demonstrated by the data in Table I, in which the over-basing preparation used was essentially as that used in Example I. The sulfonic acid used was an alkylated benzene sulfonic acid prepared by sulfonating detergent alkylate bottoms (DAB).

TABLE I

| Run | Reactants, moles | | | | | Product | | | |
|---|---|---|---|---|---|---|---|---|---|
| | $RSO_3H$ | CaO | $H_2O$ | $CO_2$ | $NH_3$ | Percent sulfonate | Percent Ca | Percent Ca utilization | TBN |
| A | 0.4 | 5 | 0.5 | 5 | 0.15 | 17.2 | 14.0 | 90 | 383 |
| B | 0.4 | 5 | 0.5 | 5 | 0 | Product very hazy, not analyzed | | | |
| C | 0.4 | 5 | 1.0 | 5 | 0.15 | 17.2 | 15.1 | 93 | 430 |
| D | 0.4 | 5 | 1.0 | 5 | 0 | Product unfilterable | | | |

A series of preparations of over-based magnesium sulfonates were prepared in accordance with the herein described invention using catalytic amounts of ammonia. In these preparations, a polypropylene alkylated benzene sulfonic acid of 891 molecular weight (Runs 1–3) and a detergent alkylated bottoms sulfonic acid of 490 molecular weight (Run 4) were reacted with MgO. The data in respect of the reactants used and the resultant products are given in Table II.

TABLE II

| Run | Reactants, moles | | | | | Product | | | |
|---|---|---|---|---|---|---|---|---|---|
| | $RSO_3H$ | MgO | $CO_2$ | $NH_3$ | $H_2O$ | Percent sulfonate | Percent Mg | Percent Mg utilization | TBN |
| 1 | 0.5 | 2.5 | 9 | 0.3 | 5.5 | 35 | 4.67 | 98 | 195 |
| 2 | 0.5 | 2.5 | 9 | 0 | 3.0 | 36 | 3.40 | <80 | 97 |
| 3 | 0.5 | 3.0 | 12 | 0.3 | 5.5 | 28 | 4.60 | 98 | 201 |
| 4 | 0.5 | 2.75 | 9 | 0.3 | 5.5 | 32 | 8.77 | 97 | 370 |

The data presented by the foregoing examples demonstrate that catalytic amounts of ammonia, which form ammonium carbamate in the system, are sufficient to activate alkaline earth oxides to react with the carbon dioxide to form alkaline earth carbonate for forming the over-based alkaline earth sulfonates.

Percentages given herein are weight percentages unless otherwise stated.

While particular embodiments of the invention have been described, it is to be understood that the invention is not limited thereto, but covers such modifications and variations as come within the spirit and scope of the appended claims.

We claim:
1. The method of preparing an over-based oil-soluble alkaline earth sulfonate comprising:
   (a) forming in a hydrocarbon diluent a mixture of an oil-soluble neutral alkaline earth sulfonate, an alkaline earth oxide, and about 5–20 moles of a lower alkanol;
   (b) passing into the mixture of step (a) gaseous carbon dioxide and an amount of ammonia sufficient to form in said mixture about 0.01–0.2 mole ammonium carbamate;
   (c) continuing the introduction into the reaction mixture of step (b) of gaseous carbon dioxide in an amount sufficient to convert substantially all of said alkaline earth oxide to alkaline earth carbonates, while maintaining the temperature of said mixture below the decomposition temperature of said carbamate;
   (d) adjusting the temperature of the product mixture of step (c) to a temperature of about 190–210° F. and removing said alkanol therefrom;
   (e) adding to said alkanol-free mixture at said temperature about 0.05–3 moles of water per mole of alkaline earth oxide present in step (a); and
   (f) heating the mixture of step (e) to a temperature sufficient to remove water therefrom, and thereafter filtering the mixture to remove oil-insoluble materials.

2. The method of claim 1 wherein said sulfonate is an alkaryl sulfonate.

3. The method of claim 2 wherein said alkaryl sulfonate is a polybutylene alkylated benzene sulfonate in which the polybutylene substituent has a molecular weight of from about 200 to about 2500.

4. The method of claim 2 wherein said alkaryl sulfonate is a polypropylene alkylated benzene sulfonate in which the polypropylene substituent has a molecular weight of from about 250 to about 1200.

5. The method of claim 1 wherein said alkaline earth oxide is calcium oxide.

6. The method of claim 1 wherein said alkaline earth oxide is magnesium oxide.

7. The method of claim 1 wherein said lower alkanol is methanol.

8. The method of claim 1 wherein said sulfonate is calcium alkyl benzene sulfonate; said alkaline earth oxide is calcium oxide; and said alkanol is methanol.

9. The method of claim 1 wherein said sulfonate is magnesium alkyl benzene sulfonate; said alkaline earth oxide is magnesium oxide; and said alkanol is methanol.

References Cited

UNITED STATES PATENTS

| | | | |
|---|---|---|---|
| 2,956,018 | 10/1960 | Carlyle et al. | 260—505 |
| 3,126,340 | 3/1964 | Sabol et al. | 252—18 |
| 3,320,162 | 5/1967 | Axe et al. | 252—18 |

DANIEL E. WYMAN, Primary Examiner

I. VAUGHN, Assistant Examiner

U.S. Cl. X.R.

252—33